United States Patent
Patrice et al.

(10) Patent No.: US 6,386,459 B1
(45) Date of Patent: May 14, 2002

(54) CONTACTLESS INTEGRATED-CIRCUIT CARD COMPRISING INHIBITING MEANS

(75) Inventors: Philippe Patrice, Allauch; Laurent Oddou, La Ciotat, both of (FR); Ray Freeman, Mesa, AZ (US); Thierry De Ffontaines, Roquefort la Bedoule; Michael Zafrany, Marseille, both of (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/647,488
(22) PCT Filed: Mar. 26, 1999
(86) PCT No.: PCT/FR99/00704
  § 371 Date: Jan. 4, 2001
  § 102(e) Date: Jan. 4, 2001
(87) PCT Pub. No.: WO99/50789
  PCT Pub. Date: Oct. 7, 1999

(30) Foreign Application Priority Data
  Mar. 30, 1998 (FR) .................................. 98 04197

(51) Int. Cl.[7] .............................................. G06K 19/06
(52) U.S. Cl. .................... 235/492; 235/441; 235/439
(58) Field of Search ................................ 235/492, 441, 235/380, 439, 375; 343/867, 895

(56) References Cited

U.S. PATENT DOCUMENTS

| | | | | |
|---|---|---|---|---|
| 5,313,052 A | * | 5/1994 | Watanabe et al. | 235/375 |
| 5,321,240 A | * | 6/1994 | Takahira | 235/380 |
| 5,337,063 A | * | 8/1994 | Takahira | 343/895 |
| 6,073,856 A | * | 6/2000 | Takahashi | 235/492 |
| 6,184,846 B1 | * | 2/2001 | Myers et al. | 343/895 |
| 6,255,725 B1 | * | 7/2001 | Akagawa et al. | 257/679 |

FOREIGN PATENT DOCUMENTS

| | | | |
|---|---|---|---|
| EP | 0706153 A | | 4/1996 |
| JP | 411126245 A | * | 5/1999 |
| JP | 2000036020 A | * | 2/2000 |
| JP | 2000215288 A | * | 8/2000 |
| JP | 2000215290 A | * | 8/2000 |
| WO | WO9312513 | | 6/1993 |

* cited by examiner

Primary Examiner—Michael G. Lee
Assistant Examiner—Yen-Chau Le
(74) Attorney, Agent, or Firm—Burns, Doane, Swecker & Mathis, L.L.P.

(57) ABSTRACT

A contactless smart card has a sheet-like body containing an integrated circuit and an antenna via which the integrated circuit communicates with a terminal. The antenna lies in the plane of the card body and is constituted by several turns of a conductor that form a winding. A conductive bridge connects at least two turns of the winding to reduce its inductance. The card body includes a rupture zone that is designed to be broken when the card is first used. A portion of the connecting bridge lies within the rupture zone, so that it is broken when the rupture zone is broken during use.

17 Claims, 4 Drawing Sheets

CONTACTLESS INTEGRATED-CIRCUIT CARD COMPRISING INHIBITING MEANS

This disclosure is based upon, and claims priority from, French Application No. 98/04197, filed Mar. 30, 1998; and International Application No. PCT/FR99/00704, filed Mar. 26, 1999, published by the International Bureau on Oct. 7, 1999, in a language other than English, the contents of which are incorporated herein by reference.

BACKGROUND OF THE INVENTION

The invention relates to an integrated-circuit card having inhibition means. The card can be of the contactless or contact type.

The invention relates particularly to an integrated-circuit card of the contactless type, of the type in which a card body in the form of a sheet carries an integrated circuit and an antenna by means of which the integrated circuit is able to communicate remotely with a reception terminal, and of the type in which the antenna, which lies in the plane of the card body, is produced in the form of a winding, over several turns, of a conductive track.

In a particularly usual application, the integrated-circuit cards, also referred to as smart cards, are used as a means of paying for a service. At each use of the corresponding service, at least one unit of value is decremented in an initial stock of units of value loaded in the memory of the smart card. Such applications are found for example in telephone cards and photocopier cards.

Thus the users purchase a card which is initially provided in memory with a given number of units of value corresponding to the maximum credit.

In the majority of applications in which the integrated-circuit card is used as a payment means, the cards used are of the contact card type in which the card has conductive tracks which are connected to the electronic module or integrated circuit, and which are intended to afford an electrical connection between the card and the reception terminal.

In this case, it is fairly easy to give a guarantee to the user purchasing a card assumed to include the maximum number of units of value, quite simply by surrounding the card with a sealed envelope, for example in the form of a "cellophane" packaging, which prevents any electrical contact with the conductive tracks.

Such a solution is however not satisfactory when it is a case of a contactless card with which the exchanges of information take place at a distance, for example by means of radiofrequency waves. This is because this exchange of information can then take place through the cellophane envelope, which can therefore no longer serve as a guarantee of the prior non-use of the card.

SUMMARY OF THE INVENTION

The purpose of the invention is therefore to propose a novel design of an integrated-circuit card, or smart card, in which means are provided for preventing any fraudulent use of the card before first use thereof by an authorised user.

For this purpose, the invention proposes an integrated-circuit card of the type described above, characterised in that at least one conductive connecting bridge is provided, which connects at least two turns of the antenna in order to reduce the inductance thereof, and in that the connecting bridge lies partly in a rupture zone of the card body which is intended to be broken at the time of the first use of the card in order to break the connecting bridge.

According to other characteristics of the invention:

the antenna is connected to the integrated circuit by means of two terminals and, before being broken, the connecting bridge connects the two terminals;

the connecting bridge connects an internal turn to an external turn of the antenna;

the card has several connecting bridges which each connect two consecutive turns of the winding;

the card has several rupture zones each intended to allow the breaking of at least one connecting bridge;

the connecting bridge is produced simultaneously with the winding;

the connecting bridge is produced in the form of a member attached with respect to the winding; and the connecting bridge straddles the turns of the winding, and an insulant is provided which is interposed between the connecting bridge and the turns.

BRIEF DESCRIPTION OF THE DRAWING

Other characteristics and advantages of the invention will emerge from the following description, with reference to the accompanying drawings, in which.

DETAILED DESCRIPTION

FIGS. 1 to 5 illustrate different steps of the manufacture of an integrated-circuit card according to a first embodiment of the invention.

An integrated-circuit card 10 has essentially a card body 12 which has the shape of a rectangular sheet with rounded corners and which is generally produced from plastics material by injection or lamination. The card body 12 carries an integrated circuit (not shown), also referred to as a chip, which can for example be embedded in the card body 12.

Figure 1:
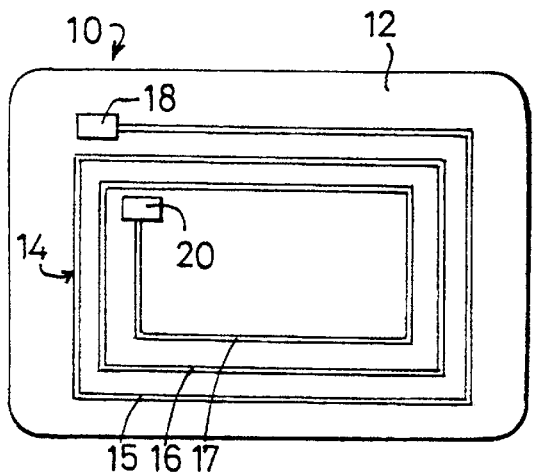
FIGS. 1 to 5 are schematic views of a smart card according to the teachings of the invention, depicted in different steps of its manufacture and use.

As can be seen in FIG. 1, the card body 12 carries, on one of its two faces, an antenna 14.

The antenna 14 can be produced for example by screen-printing in a conductive ink, or by etching copper, aluminium or a tin-lead alloy. The antenna 14 can also be produced by any method of metallising a plastics material. The typical thickness of a conductive slug thus formed is for example between 3 and 50 micrometers.

The antenna 14 is in a conventional manner produced in the form of a continuous conductor 16 which winds in a rectangular spiral having a certain number of turns disposed concentrically and therefore lying in the plane of the card body 12. The conductor 16 thus winds in a spiral from an external turn 15 as far as an internal turn 17. The two ends of the conductor 16 form respectively an external terminal 18 and an internal terminal 20 by means of which the antenna 14 is intended to be connected to the integrated circuit.

Figure 2:
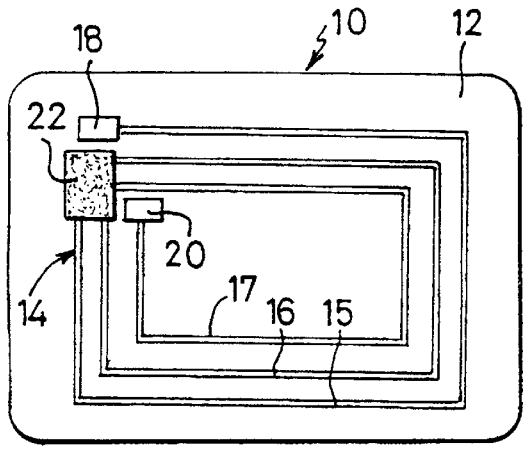

In a subsequent step of manufacturing the card 10, which is depicted in FIG. 2, an insulating slug 22 is produced, which covers part of the turns of the winding of the conductors 16. More particularly, the insulating slug 22 is arranged on the intermediate turns between the internal turn 17 and the external turn 15, close to the two terminals 18, 20 which are grouped together in a corner of the quadrilateral formed by the winding.

The insulating slug 22 can be produced by the deposition of a dielectric material, for example by screen-printing, spraying or atomisation. The thickness of the material to be deposited depends on the dielectric constant of the material. It is normally between 10 and 30 micrometers.

Figure 3:
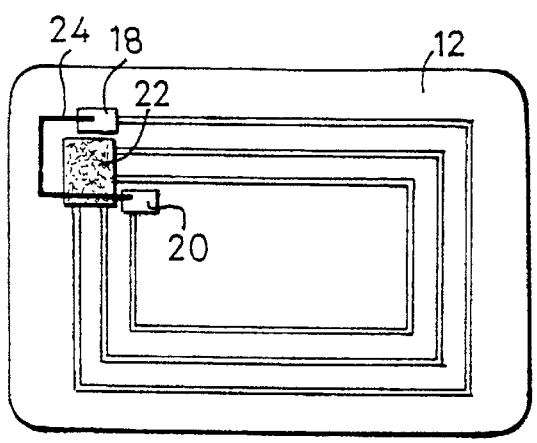

The manufacturing step illustrated in FIG. 3 consists of the production of the connecting bridge 24 according to the invention. The connecting bridge 24 is a conductor which connects the two terminals 18, 20, that is to say the internal turn 17 to the external turn 15 of the winding. The connecting bridge 24 thus straddles the intermediate turns but does not come into contact with them because of the presence of the insulating slug 22 The connecting bridge 24 can be produced according to the same technique as the conductor which constitutes the antenna 14, or according to a different technique.

According to one aspect of the invention, the connecting bridge 24 lies outside the winding of the antenna 14 and lies more particularly in a zone of the card 10 which will be intended to be broken subsequently. In this case, the connecting bridge 24 forms a loop which lies in a corner of the card support 12.

Figure 4:
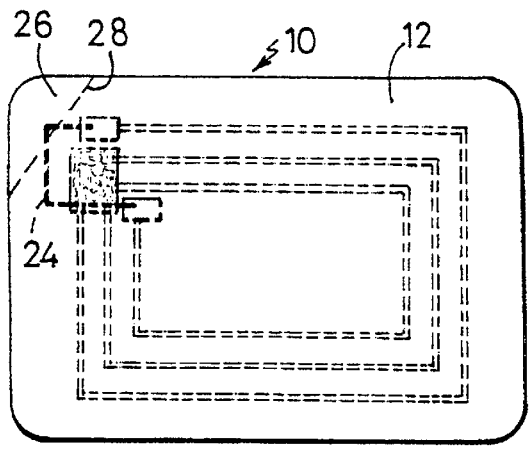
Figure 5:
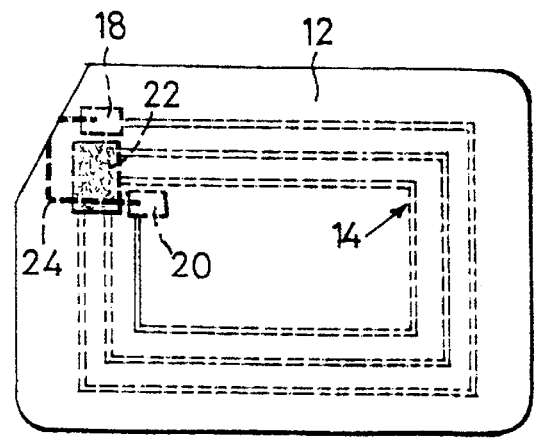

FIG. 4 illustrates the card 10 after it has been covered with a protective external layer intended to protect the antenna 14 and the connecting bridge 24, which are then embedded in the card body, just like the integrated circuit. This protective layer is however not obligatory for implementing the invention.

An incipient break 28 is then formed in the card body, for example in the form of a notch, in order to delimit the zone 26, in which the connecting bridge 24 partially lies, from the remainder of the card 10

At this manufacturing step, the card 10 is ready to be distributed and sold. It may possibly be packaged in a plastic envelope, possibly transparent.

When the user purchases the card, the latter is therefore in the form illustrated in FIG. 4. However, in this state, the card 10 is unusable since the antenna 14 is short-circuited because of the presence of the connecting bridge 24. Thus the total inductance of the antenna 14 is very low because, through the presence of the connecting bridge 24 everything occurs as if it had only one turn.

When the user wishes to put the card in service, either as soon as he purchases it or at the time of the first use, he therefore must separate the zone 26 from the remainder of the card, in this case by a simple bending thereof. The incipient rupture 28 formed by the notch allows easy detachment of the zone 26. In detaching itself, the zone 26 causes the rupture of the connecting bridge 24 which is therefore no longer in a position to short-circuit the antenna 14, which then makes it possible for the card to communicate with a suitable reception terminal.

Thus, by making the functioning of the card 10 dependent on a prior rupture of the area 26 in which the connecting bridge 24 partially lies, the user has the guarantee that, when he purchases the card 10, the latter has not been able to be used before, provided of course that he checks its integrity. Where he purchases a card containing a credit of a given number of units of value, the user is therefore sure that the card includes the number of units of value indicated.

Figure 6:
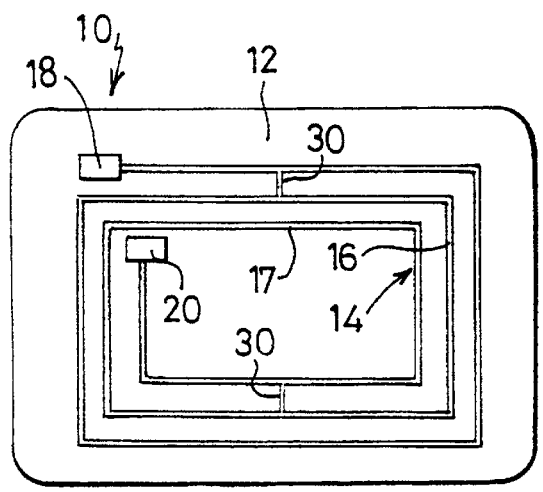
FIGS. 6 to 9 illustrate a second embodiment of the invention.
Figure 7:
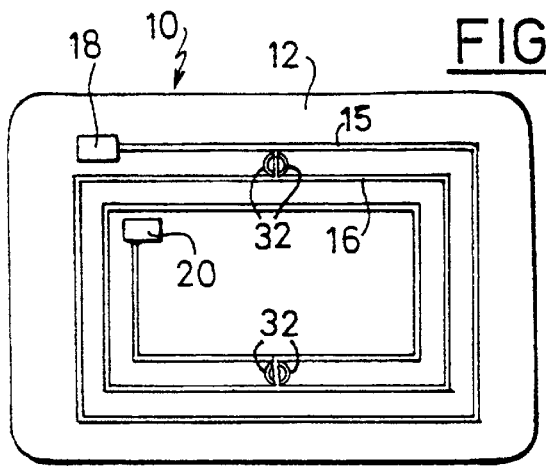
Figure 8:
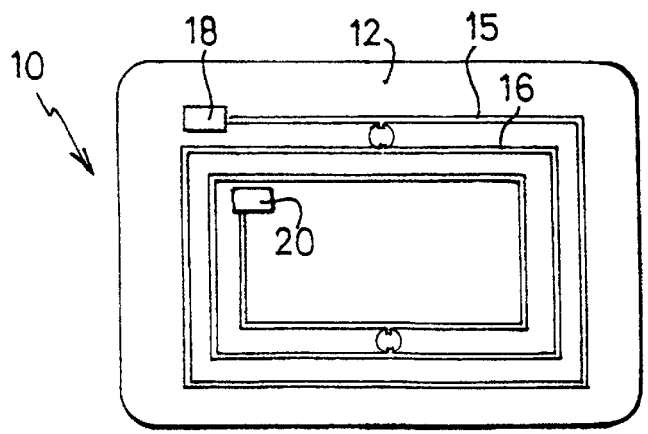

FIGS. 6 to 8 illustrate different steps of a method of manufacturing a card according to a second embodiment of the invention. At the step illustrated in FIG. 6, which corresponds to the one illustrated in FIG. 1 for the previous embodiment, it can be seen that the antenna 14 has connecting bridges 30 which are produced at the same time as it, for example by screen-printing, etching or metallisation. These connecting bridges 30 can therefore connect only consecutive turns of the winding. Several connecting bridges 30 have therefore been provided, connecting together different intermediate turns.

Figure 9:
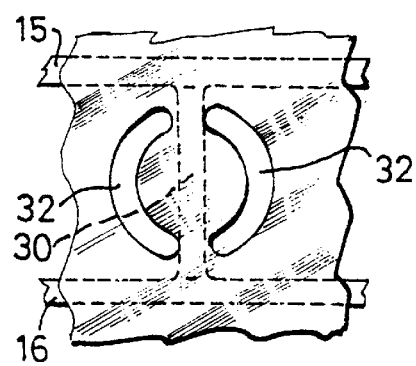

The card 10 can then be covered with an external protective layer, as has been seen with reference to FIG. 4 concerning the first embodiment. As can be seen in FIG. 7, the card thus obtained is then provided with incipient breaks 32 which are more particularly illustrated in FIG. 9. It can be seen that the incipient breaks 32 are produced in the form of a pair of notches in the shape of an arc of a circle provided in the card body 12 on each side of each connecting bridge 30 so that the zone 32 which carries the connecting bridge 30 is weakened with respect to the rest of the card, from which it can then be easily separated.

This operation can be performed, for example, by means of a cutting tool such as a punching tool. Preferably, provision will be made for the card 10 to be able to be used only when the connecting bridges 30 have been broken, as illustrated in FIG. 8.

In the two example embodiments of the invention which have just been described, the two terminals 18, 20 of the antenna 14 by means of which the latter is connected to the integrated circuit are arranged one inside the other outside the winding of the conductor 16.

However, it is known that antenna can be produced in which the two terminals 18, 20 are both arranged either inside or outside the winding. For this purpose, it is necessary to effect an electrical connection passing through the intermediate turns with the interposing of an insulating slug.

Figure 10:
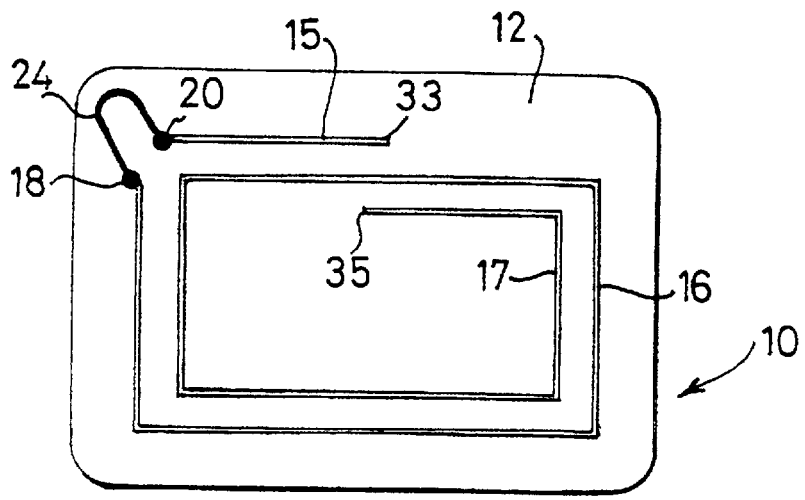
FIGS. 10 to 12 illustrate a third embodiment of the invention.
Figure 11:
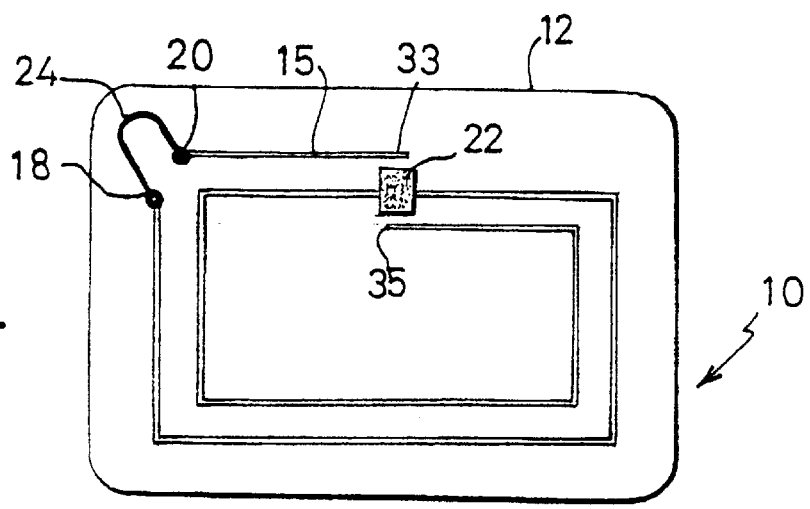
Figure 12:
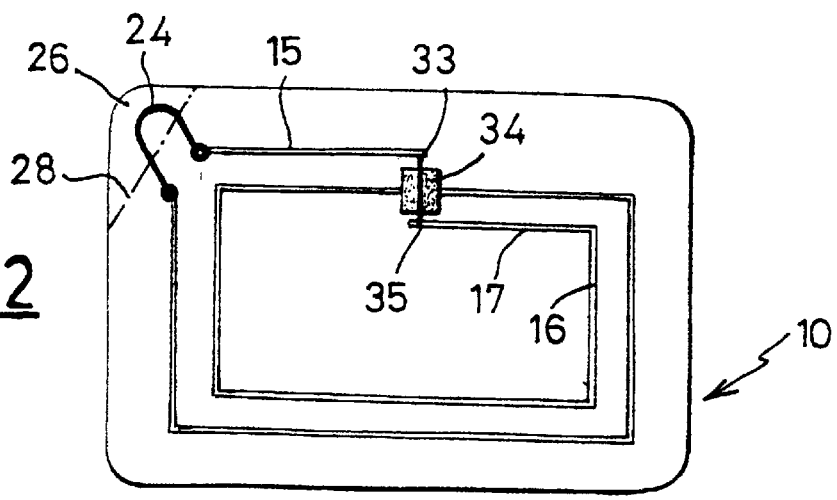

A first example of such a design is illustrated in FIGS. 10 to 12.

In the example embodiment illustrated in FIG. 10, a winding in a rectangular spiral similar to those seen previously has been printed on a card support. However, it can be seen that the two terminals 18, 20 have been provided close to each other on the external turn 17 of the winding. More precisely, the two terminals 18, 20 are connected together by a portion of conductor which forms the connecting bridge 20 and which extends in a loop outside the winding, in a zone of the card which is intended to be broken. In this case, the loop formed by the connecting bridge extends as far as a corner 26 of the card delimited by an incipient break 28.

In the state illustrated in FIG. 10, the winding is therefore continuous between its two ends, external 33 and internal 35, which are arranged close to each other but on each side of the intermediate turns.

In a subsequent manufacturing step illustrated in FIG. 11, the intermediate turns between the external turn 15 and the internal turn 17 are covered, at the ends 33, 35, with an insulating slug 22 At the step illustrated in FIG. 12, the ends 33, 35 of the winding are electrically connected by a connecting lug 34 which straddles the intermediate turns but which is insulated therefrom by the slug 22.

It can then be seen that the antenna 14 thus produced is in short-circuit. It is also connected to the integrated circuit by the two terminals 18, 20.

As seen previously, after attachment and connection of the chip, the card 10 can then be provided with an external protective layer intended to protect the antenna 14, the connecting bridge 24 and the connecting lug 34. This step is however not obligatory.

When the user purchases the card, the latter is therefore unusable. However, by detaching the zone 26 from the remainder of the card, the user breaks the connecting bridge 24 so that the winding is once again open and the antenna can then function.

The ends of the winding are then formed by the two terminals 18, 20, the terminal 20 being connected to the internal turn 17 of the winding by means of the connecting lug 34.

Figure 13:
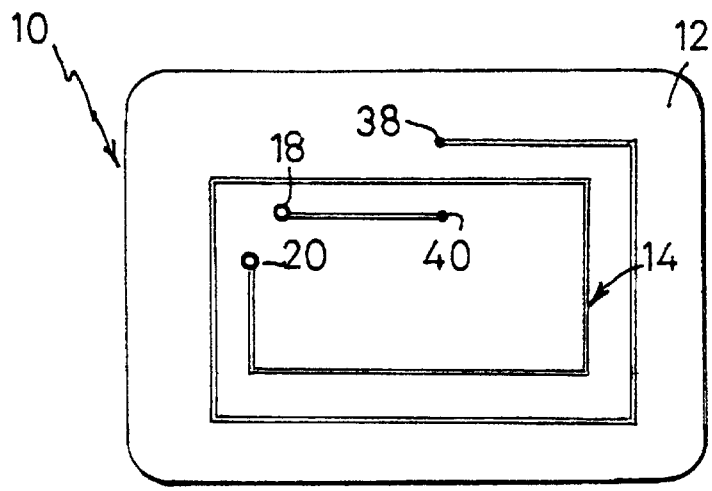
FIGS. 13 to 15 illustrate a fourth embodiment of the invention.
Figure 14:
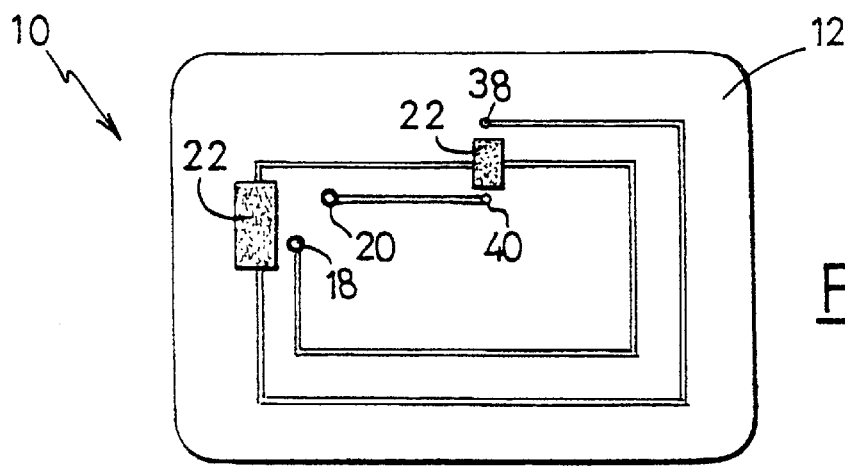
Figure 15:
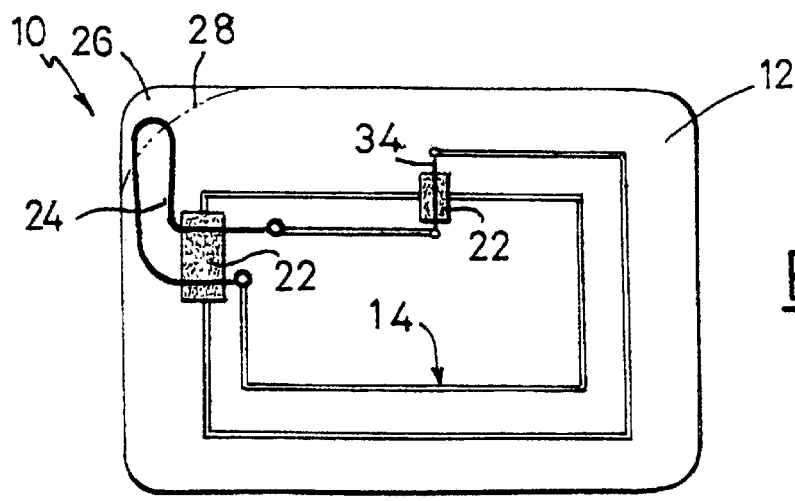

In the fourth embodiment of the invention illustrated in FIGS. 13 to 15, it is sought to obtain an antenna whose terminals 18, 20 are arranged inside the winding constituting the antenna 14. This makes it possible in particular to arrange the integrated circuit in a simple manner at the centre of the winding.

To this end, it can be seen in FIG. 13 that a discontinuous winding of a conductor carried by the card body 12 is produced. This discontinuous winding has two terminals 18, 20 which are intended to be connected by the connecting bridge 24 within the meaning of the invention and two ends 38, 40 which are intended to be connected by a connecting lug 34 identical to the one seen in relation to the embodiment in FIGS. 10 to 12.

The connecting bridge 24 and the connecting lug are intended to be produced in the same way, during the same step of manufacturing the card 10.

Thus the intermediate turns between the external turn 15 and the internal turn 17 are covered, at two different places, by an insulating slug 22 The first insulating slug is intended to enable the connecting bridge 24 which must extend outside the winding, to pass over the intermediate turns without being in electrical contact with them. The second insulating slug extends between the ends 38, 40 of the winding so as to prevent the connecting lug 34 causing a short-circuit between the turns.

At the manufacturing step illustrated in FIG. 15, on the one hand the connecting bridge 24 and on the other hand the connecting lug 34 have been produced, which, as long as the connecting bridge 24 is intact, mean that the winding of the antenna 14 is in short-circuit. However, as soon as the user has broken the connecting bridge 24 by detaching the zone 26 of the card which is delimited by the incipient break 28, the antenna 14 is no longer in short-circuit and is therefore able to transmit information.

The invention can also be used on contact cards. In an example embodiment, it suffices to connect two ends of a loop 24 respectively to two suitable contact areas of a smart card module or to the chip.

In the first case, the method of producing a contact card with inhibition means may make provision for allowing the two ends of the loop to open out into a cavity in a card body, notably on its top surface in contact with the support film of an integrated-circuit module. Moreover, orifices are provided passing through the support film of the module in order to access the contact areas, the orifices are filled with conductive glue, and then the module is attached in the cavity so that the glue falls opposite the ends of the loop in order to provide a connection.

As will have been understood, the invention can concern any support containing an electrical circuit including a short-circuit element inhibiting the functioning of the said electrical circuit, the said element having a portion extending in a zone of the said support, the said portion being easily separable from the remainder of the element.

In general terms, the said electrical (or electronic) circuit can comprise a circuit element able to inhibit the at least partial functioning of the said circuit and whose rupture permits the at least partial functioning of the said circuit.

The electrical circuit can of course comprise and/or be connected to an electronic component such as an integrated circuit of an electronic chip.

In a more sophisticated variant, the said circuit element can be a logic locking key or the like, notably with a capacitor, or with a resonant circuit, etc.

The circuit element can lie in a zone of the said support but it can also lie outside the material of the support. Thus, for example, it is possible to have a loop or segment which is visible and breakable outside the support.

In an example in which the support comprises at least one integrated-circuit chip, and where applicable an antenna, the circuit element (notably short-circuit) can be connected to the integrated circuit by two pads on the latter so as to inhibit the total or partial functionality of it.

What is claimed is:

1. A contactless integrated-circuit card, comprising:
   a card body in a form of a sheet,
   an integrated circuit in said card body,
   an antenna by means of which the integrated circuit is able to communicate at a distance with a reception terminal, said antenna comprising plural turns of a conductor that form a winding which lies in a plane of the card body, and
   at least one conductive connecting bridge which connects two consecutive turns of the antenna in order to reduce the inductance thereof, wherein said connecting bridge lies partly in a rupture zone of the card body which is intended to be broken when the card is first used in order to break the connecting bridge.

2. A contactless integrated-circuit card according to claim 1 wherein the connecting bridge connects an internal turn of the antenna to an external turn of the antenna.

3. A contactless integrated-circuit card according to claim 1, wherein the card has plural connecting bridges wherein each connecting bridge connects two consecutive turns of the winding.

4. A contactless integrated-circuit card according to claim 3, wherein the card has plural rupture zones, each of which permits a rupture of at least one connecting bridge.

5. A contactless integrated circuit card according to claim 4, wherein each of said plural rupture zones is located between two consecutive turns of the antenna winding.

6. A contactless integrated circuit card according to claim 5, wherein each of said plural rupture zones is formed by a pair of notches in the card body on opposite respective sides of an associated connecting bridge.

7. A contactless integrated circuit card according to claim 6, wherein said notches are arc-shaped.

8. A contactless integrated circuit card according to claim 3, wherein each of the connecting bridges connects a different respective pair of consecutive windings.

9. A contactless integrated-circuit card according to claim 1 wherein the connecting bridge is produced simultaneously with the winding.

10. A contactless integrated-circuit card according to claim 1, wherein the connecting bridge comprises an element which is attached to the winding.

11. A contactless integrated circuit card according to claim 1, wherein said rupture zone is located between said two consecutive turns.

12. A contactless integrated circuit card according to claim 11, wherein said rupture zone is formed by a pair of notches in the card body on opposite respective sides of said connecting bridge.

13. A contactless integrated circuit card according to claim 12, wherein said notches are arc-shaped.

14. A contactless integrated-circuit card, comprising:
   a card body forming a planar sheet,
   an integrated circuit in said card body,
   an antenna by means of which the integrated circuit is able to communicate at a distance with a reception terminal, said antenna comprising plural turns of a conductor that form a winding which lies in a plane of the card body, and
   at least one conductive connecting bridge which connects two turns of the antenna in order to reduce the inductance thereof, wherein said connecting bridge lies in a rupture zone of the card body which is located within the turns of the antenna and is intended to be broken when the card is first used in order to break the connecting bridge.

15. A contactless integrated-circuit card according to claim 14 wherein the connecting bridge connects an internal turn of the antenna to an external turn of the antenna.

16. A contactless integrated-circuit card according to claim 14, wherein the card has plural connecting bridges each of which connects two consecutive turns of the winding.

17. A contactless integrated-circuit card according to claim 16, wherein the card has plural rupture zones, each of which is located within the turns of the antenna and permits a rupture of at least one connecting bridge.

* * * * *